Figure 10:
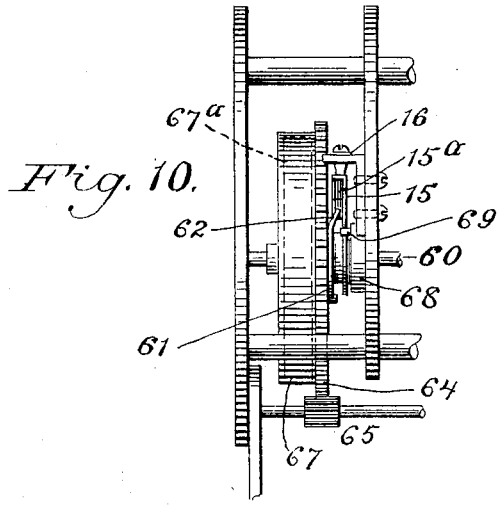

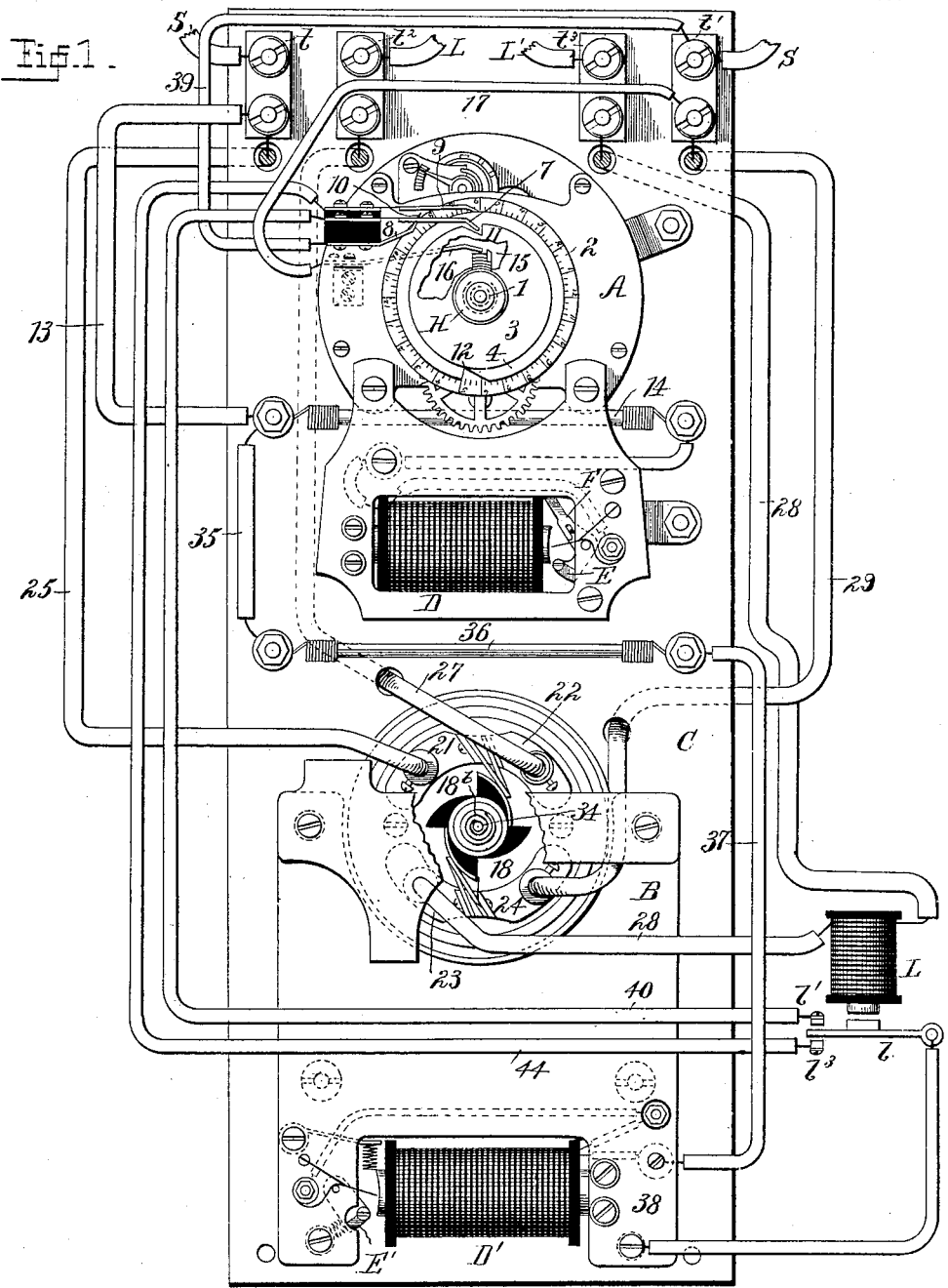

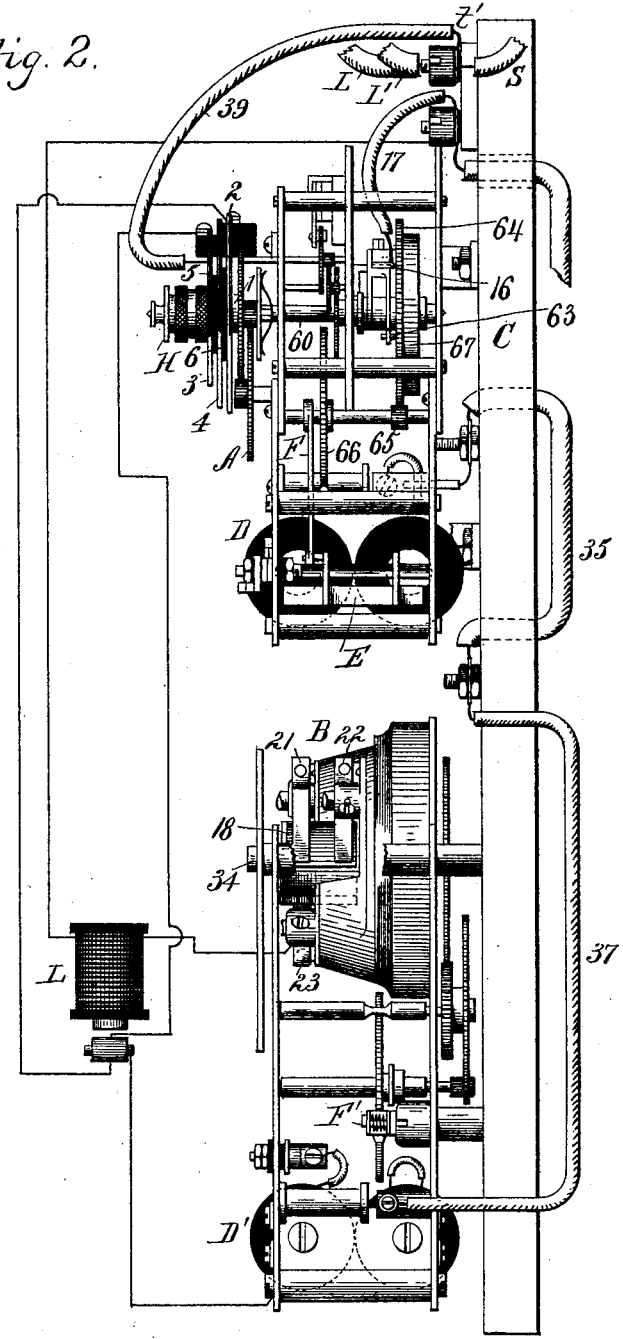

No. 611,822. Patented Oct. 4, 1898.
F. M. SCHMIDT, J. H. GERRY & W. S. BARSTOW.
ELECTRIC TIME SWITCH.
(Application filed Nov. 18, 1897.)
(No Model.) 7 Sheets—Sheet 3.
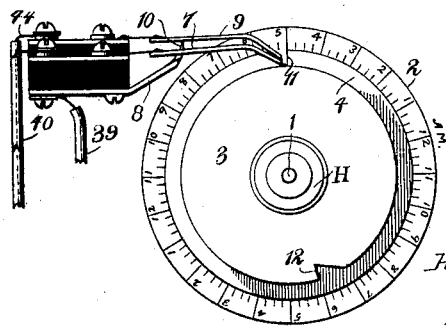
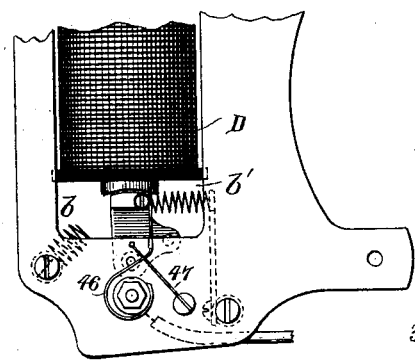
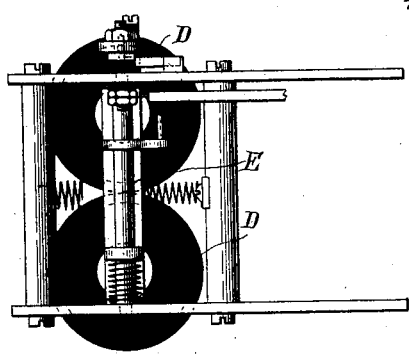
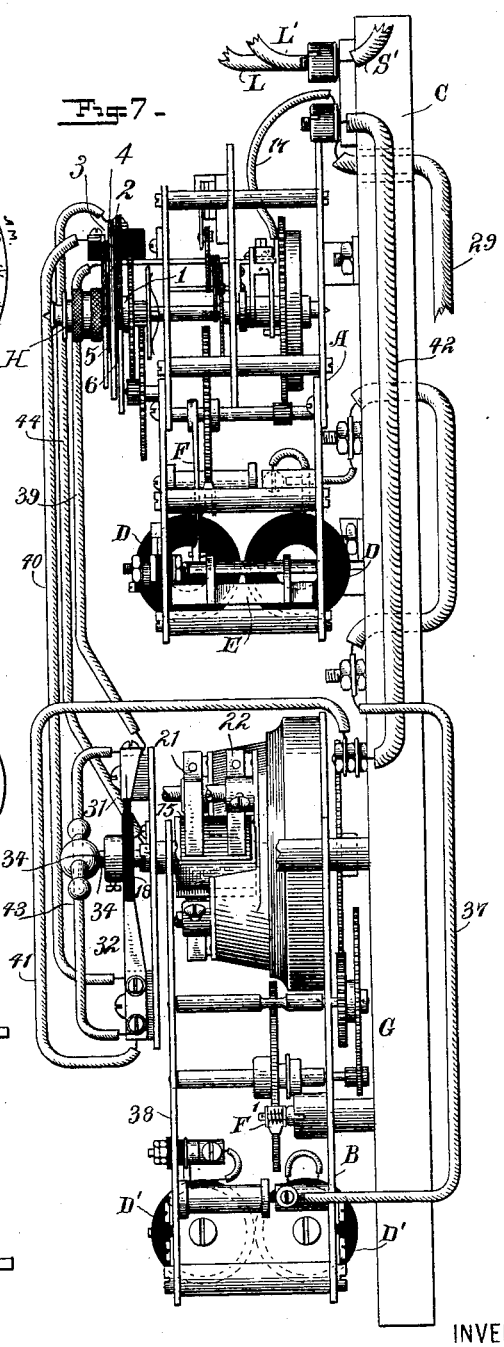
WITNESSES:
INVENTORS
ATTORNEY No. 611,822. Patented Oct. 4, 1898.
F. M. SCHMIDT, J. H. GERRY & W. S. BARSTOW.
ELECTRIC TIME SWITCH.
(Application filed Nov. 18, 1897.)
(No Model.) 7 Sheets—Sheet 4.
Fig. h.
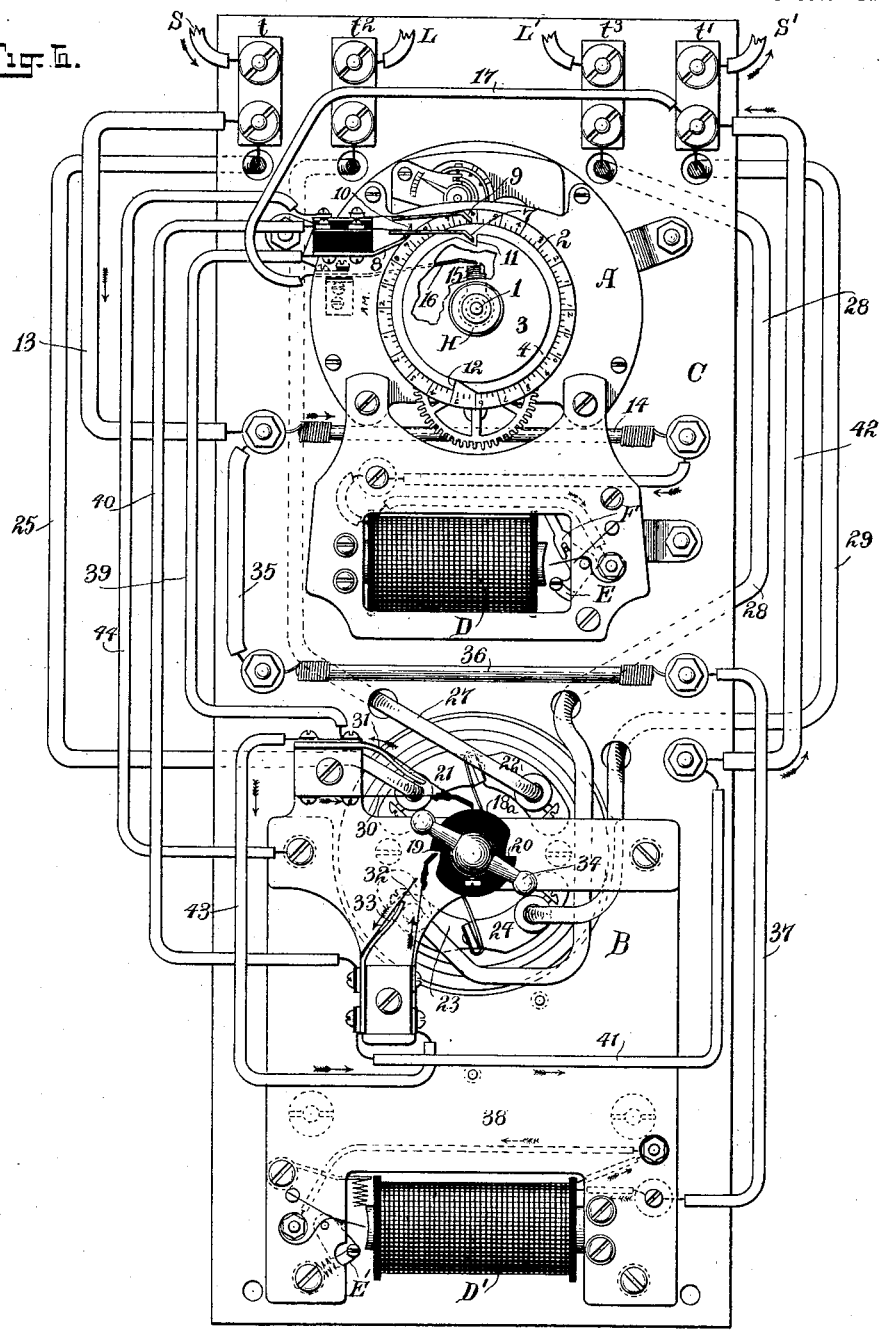
WITNESSES:
INVENTORS
ATTORNEY No. 611,822. Patented Oct. 4, 1898.
F. M. SCHMIDT, J. H. GERRY & W. S. BARSTOW.
ELECTRIC TIME SWITCH.
(Application filed Nov. 18, 1897.)
(No Model.) 7 Sheets—Sheet 5.
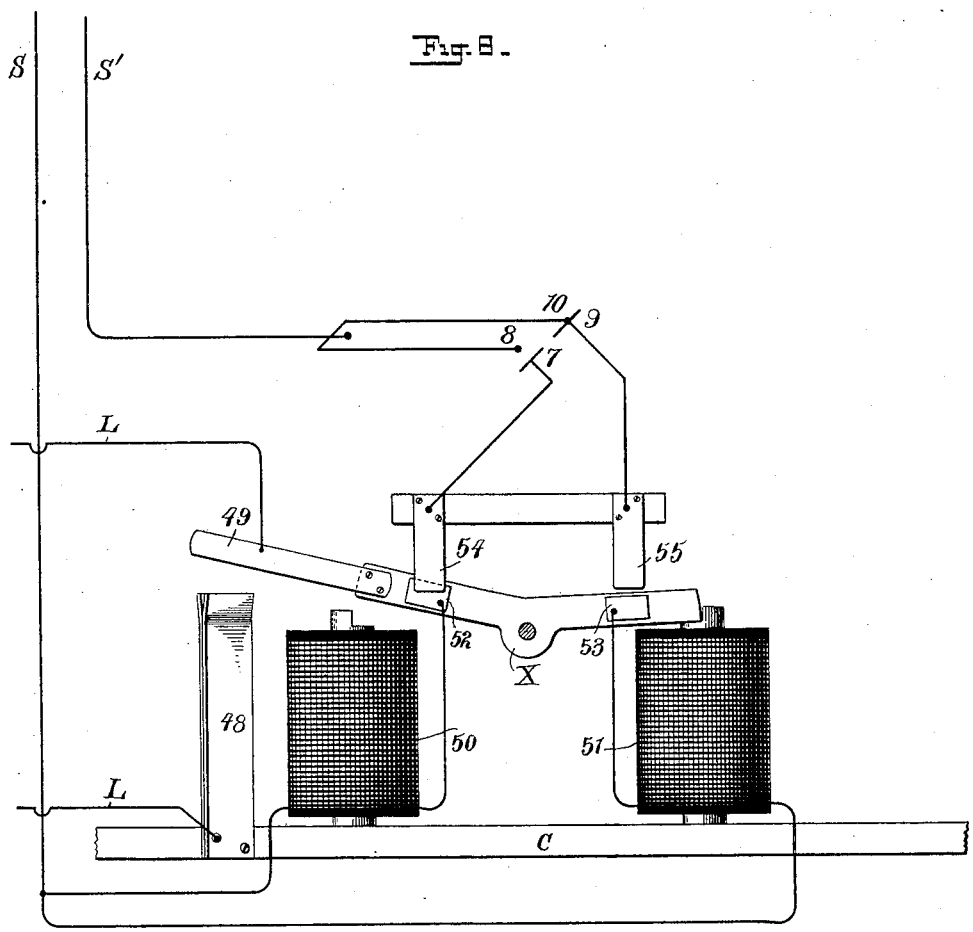

No. 611,822. Patented Oct. 4, 1898.
F. M. SCHMIDT, J. H. GERRY & W. S. BARSTOW.
ELECTRIC TIME SWITCH.
(Application filed Nov. 18, 1897.)
(No Model.) 7 Sheets—Sheet 6.
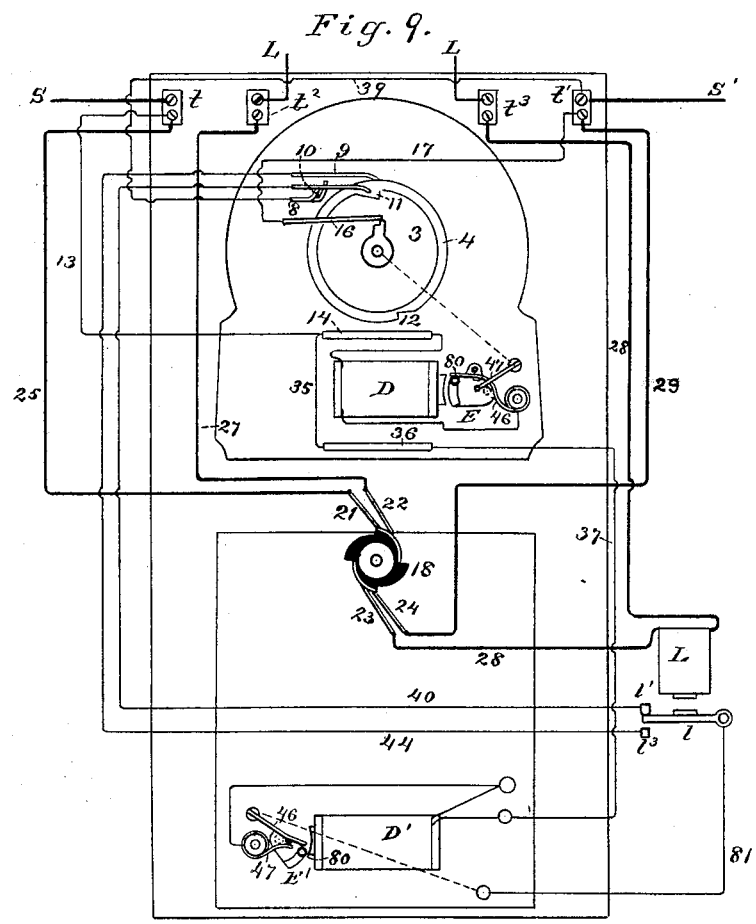

No. 611,822. Patented Oct. 4, 1898.
F. M. SCHMIDT, J. H. GERRY & W. S. BARSTOW.
ELECTRIC TIME SWITCH.
(Application filed Nov. 18, 1897.)
(No Model.) 7 Sheets—Sheet 7.

WITNESSES:

INVENTORS:
Frederick M. Schmidt
James H. Gerry
William S. Barstow
BY
ATTORNEY

UNITED STATES PATENT OFFICE.

FREDERICK M. SCHMIDT, JAMES H. GERRY, AND WILLIAM S. BARSTOW, OF NEW YORK, N. Y., ASSIGNORS TO THE SELF WINDING CLOCK COMPANY, OF SAME PLACE.

ELECTRIC TIME-SWITCH.

SPECIFICATION forming part of Letters Patent No. 611,822, dated October 4, 1898.

Application filed November 18, 1897. Serial No. 659,050. (No model.)

*To all whom it may concern:*

Be it known that we, FREDERICK M. SCHMIDT, JAMES H. GERRY, and WILLIAM S. BARSTOW, citizens of the United States, residing in New York, (Brooklyn,) county of Kings, State of New York, have invented certain new and useful Improvements in Electric Time-Switches, of which the following is a specification.

This invention relates to improvements in electric clocks and time-switches, and comprises a novel system of circuits and devices whereby electric circuits of considerable energy may be brought under the control of the comparatively delicate mechanism of an electric clock by the intervention of a secondary apparatus which is controlled by the clock and is of sufficient strength and power to do the work required.

Our invention is particularly intended for turning on and off the current of arc-lights on incandescent or multiple circuits, where it is desirable that such arc-lights shall be turned off and on at regular intervals without interfering with the main-line current, which may be required for other lamps or translating devices. The arc-lamps being arranged in separate branches, generally a pair of lamps in each branch, they are cut into or out of circuit by individual or separate switches, one placed in each branch or controlling a group of branches. Our invention comprises means whereby such switches may be controlled to open and close these branch circuits automatically at predetermined times on schedule, as above mentioned. For this purpose direct interposition of the clock mechanism or of contacts forming a part thereof in the arc-lamp circuit is not desirable, for the reason that the clock mechanism and contacts are necessarily delicate and comparatively slow in motion, while the arc-light current, being of considerable volume and potential, requires switching devices of strong and heavy construction and rapid movement, especially in breaking the circuit, so as to prevent undue damage to the contacts thereof by arcing. We therefore employ a secondary controlling device comprising an electromagnetic device connected to a source of electric current through contacts controlled by said clock and operating a quick-break electric switch included in the circuit of the arc-lamps. This secondary controlling device comprises also other contacts and connections whereby when it has once been set in motion through its connection with the clock it will continue to operate independently of such clock connection till its function has been performed, whereupon a different connection with the clock will be established. These two different connections with the clock are controlled, respectively, by two sets of contacts in the clock, which are operated alternately, so that the operation of either will set the secondary controlling device in motion, cause it to perform its function, and to connect itself to the other set of contacts, which then, after a predetermined lapse of time, are in turn operated by the clock to start a further movement of the secondary controlling device, causing it to perform the reverse operation to its previous one and to then restore the clock connection to the original condition.

For rewinding the electric clock at intervals and for impelling the secondary controlling device we prefer to use step-by-step electromagnetic mechanisms, and a further feature of our invention relates to a special construction of the make-and-break contacts of such mechanisms.

Our invention is also applicable to the control of electrical or electromechanical devices of any kind which it is desired to operate at stated times according to schedule. Thus it may be applied to control the current for illuminating clock-dials or to effect the operation through appropriate electric circuits and devices of sign or card displaying apparatus, program instruments, steam-whistles, &c.

Figure 11:
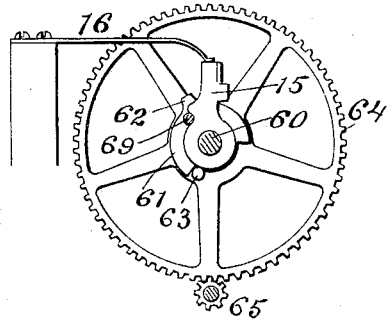

Referring to the accompanying drawings, which form a part of this specification, Figure 1 is a front elevation of an electric clock and controlling-switch embodying our invention. Fig. 2 is a side elevation thereof. Fig. 3 is a detail view of the clock-circuit-controlling device. Fig. 4 is an elevation of a part of the electromagnetic step-by-step mechanism, showing our improved make-and-break device. Fig. 5 is a horizontal view of same, looking from below. Figs. 6, 7, and 8 show modifications. Fig. 9 is a diagram of the connections of the several circuit making and breaking devices, the path of the current through the respective frames of the clock and secondary device being indicated by broken lines. Figs. 10 and 11 show details of the clock mechanism.

A represents an electric self-winding clock, and B the secondary controlling device, both of which may, as shown, be mounted on the same supporting-base C, of wood or other insulating material, to which the various terminals for the circuits are also secured.

The mechanism of the clock A is in the main identical with that of self-winding clocks now in common use and well known, differing only in certain details of the step-by-step winding mechanism. This comprises a magnet D, armature E, special make-and-break devices hereinafter more fully described, and a pawl mechanism F, which imparts a step-by-step motion to the winding-arbor of the clock when the armature E is vibrated.

On the arbor or sleeve 1 of the clock, which is preferably geared to make one revolution every twenty-four hours, is fastened a dial 2, marked circumferentially with numbers indicating the hours from "1" to "12" in two series. Two disks 3 4 are supported on the arbor 1 in such a manner as to normally rotate therewith, but are capable of being adjusted by hand to any angular position, the disks being held in place by frictional devices, as by flat or spring washers 5 6, interposed, respectively, between disks 3 and 4 and between disk 4 and dial 2, and a screw-head H, pressing disk 3 toward the dial. On loosening the screw-head 6 the washers 3 and 4 may be adjusted to any desired angular position with reference to each other and to the dial 2, and may then be clamped in this position, or the pressure on the washers may be adjusted to a degree which will cause the disks to revolve with the arbor under ordinary conditions of working, while permitting them to be adjusted by hand whenever desired.

Two sets of contacts 7 8 and 9 10 are controlled, respectively, by the disks 3 and 4, the ends of contacts 7 and 9 being formed as fingers which are adapted to rest on the peripheries of the disks, thereby holding the contact 7 or 9 away from the contact 8 or 10, or to fall into notches 11 12 in said disks, in which case the contact 7 or 9, which is thus allowed to fall, makes connection with the corresponding contact 8 or 10.

Terminals $t$ $t'$ on the base are connected to the mains or leads S S of an electric-supply circuit—as, for example, the mains of a constant-potential incandescent-lighting circuit—and terminals $t^2$ $t^3$ are connected to the leads L L' of an electric consumption-circuit or branch circuit, which may include in multiple connection any number of pairs of arc-lamps, each pair being connected in series across said leads. A connection or shunt leads from contact $t$ through wire 13, carbon resistance 14, and suitable wiring to the rewinding-magnet D, and thence through the circuit-breaker thereof to the clock-frame. On the winding arbor or drum of the train is arranged an arm 15, which when the driving-spring of the clock has about run down makes contact with a contact-spring 16 and so completes the shunt aforesaid from the clock-frame and the arm 15 to contact 16 and so by wire 17 out to the other side of the circuit at $t'$. The magnet D then operates under the control of its circuit-breaker to rapidly vibrate the armature and rewind the clock, suitable devices being present, as usual in such cases, to maintain the operation of the rewinding-magnet until the clock is fully rewound. Such devices are shown in Figs. 10 and 11. The contact-arm 15 is loosely mounted on the main arbor 60 of the clock, and an intermediate plate 61 is also loosely mounted on said arbor, this plate engaging with an extension $15^a$ from the arm 15 by a projection 62 and engaging also with a pin 63, carried by the gear-wheel 64. A pinion 65, fast on the same shaft as the winding ratchet-wheel 66, (see Fig. 2,) gears with the gear-wheel 64, so that the latter is rotated by the action of the rewinding-magnet on the ratchet-lever F, which engages with ratchet-wheel 66. The spring-barrel 67 is fastened to wheel 64 and the mainspring (indicated at $67^a$ in dotted lines in Fig. 10) is connected in the usual manner at one end to this barrel and at the other end to the main arbor 60. This main arbor carries fast thereon a collar 68, and a pin 69, projecting from this collar, engages with the arm 15, as indicated in Figs. 10 and 11. The parts are so arranged that as the clock runs down the arm 15 will be brought by the operation of parts 68 69 into contact with contact-spring 16, and this contact will continue during the rewinding by reason of the length of the outer end of contact 15 and the slowness of the motion of the main arbor, it being understood that the rewinding only takes a minute or less. When the winding has proceeded far enough, however, to bring the wheel 64 around a little beyond the position shown in Fig. 11, the pin 63 thereon engaging with plate 61, and thus bringing the projection 62 against arm 15, will throw said arm forward, and it will fall out of contact with contact-spring 16. Such a position of wheel 64 corresponds to a rewound condition of the mainspring, so that the circuit will not be broken until the clock is rewound.

The circuit-breaker for the magnet D consists of contact-springs 47 46, operated by the armatures of said magnets, contact-spring 46 being connected to the coil of magnet D, being supported on and in direct metallic contact with the frame A. The arm 15, above referred to, being uninsulated from its arbor, is connected through the said arbor and the frame A to contact 46.

The secondary controlling device B consists, essentially, of a quick-break switch controlling the consumption-circuit and a set of contacts and connections controlled by the operation of the switch and controlling the connections with the clock. To insure the proper operation of these controlling contacts and connections, we prefer to make them responsive to the condition of the consumption-circuit rather than to the condition of the switch controlling said consumption-circuits, so that if for any reason the said switch fails to operate, although portions thereof have turned through the proper distance, then the circuit will still be left under the control of the proper contacts in the clock, as will hereinafter appear.

The switch controlling the consumption-circuit is preferably a double-pole quick-break switch comprising a cylinder 18, with contacts thereon, and fixed contacts 21, 22, 23, and 24, coöperating with the contacts on the cylinder. When this switch is in a closed position, connection is made from the main line at $t$ through wire 25 to contact 21, through the switch to contact 22, and so through wire 27 to the arc-lamp branch circuit at $t^2$. From the other side of this branch circuit at $t^3$ connection is made through wire 28, switch-contacts 23 and 24, and wire 29 to the other side of the main line at $t'$. We prefer to include in the branch circuit so formed an electromagnetic device for controlling the connections to the clock, the magnet thereof being interposed, for example, in the wire 28, as shown.

The switch-cylinder 18 is operated by an electromagnetic actuating device consisting of an electromagnet D', armature E', and pawl mechanism F', which, through a train of wheels G, causes the switch-arbor 34 to be rotated in a step-by-step manner by the vibrations of the armature of electromagnet D'. A shunt or branch circuit leads from the main line at $t'$ through wires 13 and 35, carbon resistance 36, wire 37, and suitable connections to magnet D', and thence through the automatic circuit-breaker of said magnet, comprising contact-springs 47 46, similar in operation to those of the circuit-breaker for magnet D, to the metal frame 38 of the secondary device, and from thence to the armature 1 of magnet L, it being understood that contact-spring 47 of the circuit-breaker is connected to coil of magnet D' and that contact-spring 46 is in direct contact with frame 38, which latter is connected by wire 81 to armature 1, as that indicated in Fig. 9. From this point the course taken by the circuit depends both on the position of the contact-controlling devices in the clock A and the position of the armature 1, and therefore the condition of the consumption-circuit— that is to say, the arc-lamp circuit. Assuming the latter circuit to be closed at the switch-cylinder 18, then the armature 1 will be in its attracted position, and the circuit above traced will lead from armature 1 to contact 1' and through wire 40 to contact 7. When the clock brings the notch in disk 3 under spring 7, the latter will strike contact 8, and the above connection will be continued through wire 39 to the other side of the circuit. This shunt-circuit armature through the magnet D' being thus completed, the said magnet under the control of its circuit-breaker operates the train G in a step-by-step manner, and thus rotates the switch-cylinder 18. This switch is provided with the usual devices, such as lost-motion connection and internal spring 1 for giving a quick break, and the contacts 21, 22, 23, and 24 thereof snap into the notches of cylinder 18. The latter is thus suddenly thrown to give a quick break. This opens the arc-lamp branch circuit, and the magnet L, connected therewith, being deënergized the armature $n$ thereof will be retracted and the connection above traced be broken, thus removing contacts 7 8 from the control of the secondary device. The armature at the same time makes contact with contact $1^2$ and a new connection for the electromagnet D' is established, the same leading, as before, until the armature 1 is reached and then leading from said armature through contact $1^2$ and through wire 44 to contact 9. After a certain lapse of time, determined by the adjustment of disks 3 and 4, the contact 9 will be allowed to fall on contact 10, and the above connection will be continued through contact 10 and wire 39 to the other side of the circuit, whereupon the electromagnet D' will again operate the switch-cylinder 18, and will continue to do so until the arc-lamp branch circuit is closed by the operation of said switch. When this occurs, the magnet L will at once attract its armature and remove the controlling-electromagnet D' from the control of the clock-contacts 9 and 10 and put it again under the control of contacts 7 and 8.

It will noted that the clock-contacts have in no case to break circuits, as the circuits they establish are broken by the armature 1 as soon as the desired operation has been performed.

While we prefer to control the connections between the clock and the secondary device by an electromagnet response to the current in the branch or consumption circuit, the invention may be carried out in other ways— as, for example, the switch for the consumption-circuit may directly operate those contacts. Such a modification is shown in Figs. 6 and 7. In this case the secondary controlling device B consists, preferably, of a double-pole quick-break switch comprising a contact-cylinder 18 and contacts 21, 22, 23, and 24, which coöperate with contact-plates on the cylinders in the usual manner. When this switch is in a closed position, connection is made from the main line at $t$ through wire 25 to contact 21, through the switch to contact 22, and so through wire 27 to the arc-lamp branch circuit at $t^2$. From the other side of this branch circuit at $t^3$ connection is made through wire 28, switch-contacts 23 and 24, and wire 29 to the other side of the main line at $t'$. Two sets of contacts 30 31 and 32 33 are also controlled by the operation of the secondary device, one contact 30 or 32 of each set engaging with a notch-disk $18^a$ on the same shaft as the cylinder 18 and being thus held against its corresponding contact 31 or 33 or allowed to spring away therefrom, according to whether the plain portion or a notched portion of the disk is opposite the end of the contact 30 or 32. The contact-spring 30 is fastened on and in direct contact with a part of the frame 38 and is thus in direct metallic connection with such frame. Contact-spring 31 is insulated from the frame and is connected by wire 39 to contact 8. Contact-springs 32 and 33 are insulated from the frame and from each other, contact-spring 32 being connected by wire 43 to contact 31, and contact 33 being connected by wire 41 to wire 42 and thus to supply-circuit terminal $t'$. This secondary controlling device is operated by an electromagnetic device consisting of an electromagnet D', armature E', and pawl mechanism F', which through a train of wheels G causes the switch-arbor 34 to be rotated in a step-by-step manner by the vibration of the armature of the electromagnet D'. A shunt or branch circuit leads from the main line at $t$ through wires 13 and 35, carbon resistance 36, wire 37, and suitable connections to magnet D', and thence through the automatic circuit-breaker of said magnet to the metal frame 38 of the secondary device. From this point the course taken by the circuit depends both on the position of the contact-controlling devices in the clock A and the position of the secondary controlling device. In the position of such devices shown in Fig. 1 the connection leads from the frame 38 to contact-spring 30, and the said spring 30 being in this position of the switch in contact with the spring 31 the connection is continued through said spring 31 and by wire 39 to contact 8 of the clock. The disk 3 now presenting its notch to the spring-finger 7, the latter makes contact with contact 8 and thus continues the aforesaid connection through wire 40, 41, and 42 to the other side of the circuit. This shunt connection through the magnet D' being thus completed, the said magnet under the control of its circuit-breaker operates the train G in a step-by-step manner and thus rotates the switch-cylinder 18. The first effect of this rotation is to cause the end of notch 19 to strike and raise contact-spring 32, closing the contact 32 33. This furnishes an additional or auxiliary connection for the magnet D', the circuit in this case leading, as above stated, until it reaches frame 38 and springs 30 and 31, and then passing by wire 43 to contacts 32 and 33, and thus directly to wire 41 and to the other side of the circuit. This path is a shunt to that through the contacts 7 and 8 of the clock, and it will thus be seen that the operation of the secondary device immediately closes a circuit which will continue to operate its controlling electromagnet D' independently of the clock-contacts which started such operation.

The switch-cylinder 18 in the position indicated in Fig. 1 closes the circuit to the arc-lamps or other translating devices, and the rotation of this switch, as above described, eventually breaks this circuit, the spring-terminals of contacts 21 22 23 24 snapping into notches therein in a well-known manner, giving a quick break. At the same time or a moment thereafter the spring-contact 31 falls into notch 19, breaking contact 30 31. Now as both of the circuits above traced for magnet D' included this contact 30 31 it will be seen that the motion of the switch-cylinder is at once arrested. After a certain lapse of time, however, depending on the relative positions to which the disks 3 and 4 have been set, another circuit will be established for magnet D', owing to the fall of contact 9 into notch 12 of disk 4, thereby allowing contact 9 to close with contact 10 and form a branch circuit as follows: From main line at $t'$, as before, through wires 13 35, resistance 36, wire 37, magnet D', and its circuit-breaker, to frame 38. The new connection now leads from this frame, through wire 44 to contact 9, contact 10, wires 39 and 43, contacts 33 and 32, and wires 41 and 42, to the other side of the line. The magnet D' will therefore again operate and rotate the switch. As before the first effect of this rotation will be to give an additional circuit for the magnet D' independent of the clock-contacts, this circuit being closed by the forcing of contact 30 against contact 31 by the passing away from under it of the notch 19 and the connection leading from the frame 38, through contacts 30 31, wire 43, and contacts 32 33, to wire 41, thus forming a short circuit around the clock-contacts 9 10. The switch-cylinder 18 thus continues to rotate until it has again closed contacts 21 22 and 23 24, and thereupon it allows contacts 32 33 to separate, and is thus brought to rest by the opening of its operating-circuits.

It will be seen that each operation of the secondary device so changes the connections that the electromagnetic device operating the switch is brought under the control of a different set of clock-contacts than that which started its operation, or, in other words, the two sets of contacts operated by the secondary device put the said electromagnetic device alternately in connection with two different circuits controlled by two different sets of contacts in the clock; furthermore, that these two sets of contacts in the clock are controlled by different and relatively adjustable parts of the clock, which may each be set to operate at any required time in the twenty-four hours of the day, so that the time at which the switch is opened and the time at which it is closed will be determined daily by the clock according to any predetermined schedule and without any attention on the part of an operator. A further point to be observed is that the clock being rewound, as required, by electromagnetic devices energized from the supply-circuit itself and the switch itself also being operated by energy similarly applied the system is complete and self-contained and, neglecting accidents, will run indefinitely without any attention in the way of rewinding. Of course it is to be understood that the contact-controlling devices in the clock are to be reset at certain intervals during the year according to the changing hours of darkness or for other reasons; but as regards the repeated and absolutely automatic carrying out from day to day of a predetermined schedule of operations the device is, as above stated, complete in itself.

The interposition of a secondary device to control the branch circuit has the advantage that the secondary device not being in any sense a timekeeper does not need to have the delicacy of construction or operation incident to a timepiece and can be made with sole reference to its appointed function—namely, to break currents of considerable potential and intensity in an efficient manner. For this purpose a switch having strong frictional contact of its surface and a quick snap on the break is essential, and neither of these functions is compatible with the delicacy, accuracy, and slow movement of a timepiece. A further feature of importance is that when the clock-controlled contacts have started the operation of the secondary device the latter at once removes itself from the control of the clock device, so that it is compelled to continue running until it has accomplished its function, whether the clock-contacts are opened in the meantime or not. A more important point, however, is that the secondary device, in addition to immediately diverting a part of the current from the clock-contacts, then proceeds to break the circuit through said contacts by a quick snap break between contacts on the secondary device, so that there is no possibility of the clock-contacts, which are necessarily delicate, being called upon to break a current, which might injure them.

While the above-described invention is particularly intended for application to the switching of an arc-lamp on or off of incandescent circuits, it is clear that in some of its general features it is applicable to other purposes, the arbor of the switch being in that case supposed to represent the actuating-shaft of any apparatus to be operated intermittently and at predetermined intervals, such as a signaling or display apparatus, &c.

Figs. 4 and 5 show in detail the special construction of circuit-breaker we prefer to employ for either or both of the magnets D D'. This consists of two contact-springs 46 47, which are placed so as to make contact with one another, one of said springs engaging with the armature E of the magnet. Buffer-springs $b\ b'$ cushion the armature at each end of its stroke. As the armature E is attracted its pin 80 strikes the contact-spring 46 and removes it from contact with spring 47.

In Fig. 9 the circuit-breaker 46 47 of magnet D is shown as breaking the circuit, the armature E corresponding thereto having been attracted and thus separating such contacts 46 47 momentarily. The other set of contacts 46 47 for the magnet D' are in contact, the armature E corresponding thereto being momentarily retracted.

The secondary device is not necessarily capable of complete rotation or of rotation always in one direction. It may be a vibrating device—such, for example, as that shown in Fig. 6—the same consisting of a switch-lever X, closing or opening contacts 48 49, which control a branch circuit L L, and this lever may be operated directly by two electromagnets 50 and 51, connected, respectively, to the two sets of clock-contacts 7 8 and 9 10, which are controlled by a clock in the manner above described. The switch-lever X carries contacts 52 53, which coöperate with fixed contacts 54 55 to alternately complete a circuit for magnet 50 through contacts 52 54 and clock-contacts 7 8 and a circuit for the magnet 51 through contacts 53 55 and clock-contacts 9 10. Thus if the switch be assumed to be in the position shown in the drawings the branch circuit L L will be open and a circuit may be traced from main line S at $t$ to magnet 50, contacts 52 54, and clock-contacts 7 8. As soon as the clock closes contacts 7 8 the magnet 50 will at once pull down its armature and the circuit L L will be closed, while at the same time the circuit just traced will be opened and a connection will be established from the line S at $t$ through magnet 51 and contacts 53 55 to the clock-contacts 9 10. The switch is thus put alternately under the control of the two sets of clock-contacts.

Having thus described our invention, the following is what we claim as new therein and desire to secure by Letters Patent:

1. In a system of electrical distribution the combination with an electric-supply circuit and an electric-consumption circuit, of a switch controlling the supply of current to the latter circuit and an electric self-winding clock energized from said supply-circuit, and controlling the operation of said switch to open and close the same.

2. In a system of electrical distribution, the combination with an electric-supply circuit and a circuit supplied therefrom, of a switch controlling the supply of current to the latter circuit, an electric self-winding clock energized from the supply-circuit, and an electrically-operated secondary device also energized from the supply-circuit and acting under the control of the clock to open and to close the switch.

3. The combination with an electric-supply circuit and a consumption-circuit supplied therefrom, a switch controlling the supply of current to the latter circuit and an electromagnetic device controlling said switch, a clock and two sets of contacts controlled thereby, and contacts controlled by the operation of said switch and connecting said electromagnetic device alternately to the two sets of contacts controlled by the clock, according to the position of the switch.

4. The combination with an electric circuit, and a switch controlling same, of an electromagnetic device controlling said switch, a clock and two sets of contacts controlled thereby, and an electromagnetic device responsive to the current in the aforesaid controlled circuit and connections controlled thereby connecting one or other of the sets of contacts controlled by the clock, with the switch-controlling electromagnetic device, according to whether the controlled circuit is open or closed.

5. The combination with a switch, of an electromagnetic device controlling the operation thereof, two circuits connected to and controlling said electromagnetic device, an electric clock with contacts controlling one of said circuits to start the operation of the switch and contacts controlled by the operation of the switch and controlling the other circuit after such operation has been started, to maintain the operation of such electromagnetic device.

6. The combination of a clock, a secondary device, an electromagnetic controlling device, controlling the operation of such secondary device, two sets of contacts controlled by the clock, contacts controlled by the operation of the secondary device and connecting the electromagnetic controlling device, alternately to the two sets of contacts controlled by the clock, and contacts and connections controlled by the operation of the secondary device, and operating, when the said device has been set in operation, by the connection with one of the clock-contacts, to remove the electromagnetic device from the control of the said clock-contact and put it in control of an auxiliary operating-circuit, and on the stoppage of the secondary device under the control of the auxiliary circuit, to put the electromagnetic controlling device under the control of the other set of clock-contacts.

FREDERICK M. SCHMIDT.
JAMES H. GERRY.
WILLIAM S. BARSTOW.

Witnesses:
HARRY E. KNIGHT,
M. V. BIDGOOD.